Feb. 20, 1940.  F. J. SHOOK  2,190,805
APPARATUS FOR MAKING BEAD CORES FOR PNEUMATIC TIRES
Filed July 8, 1937  2 Sheets-Sheet 1
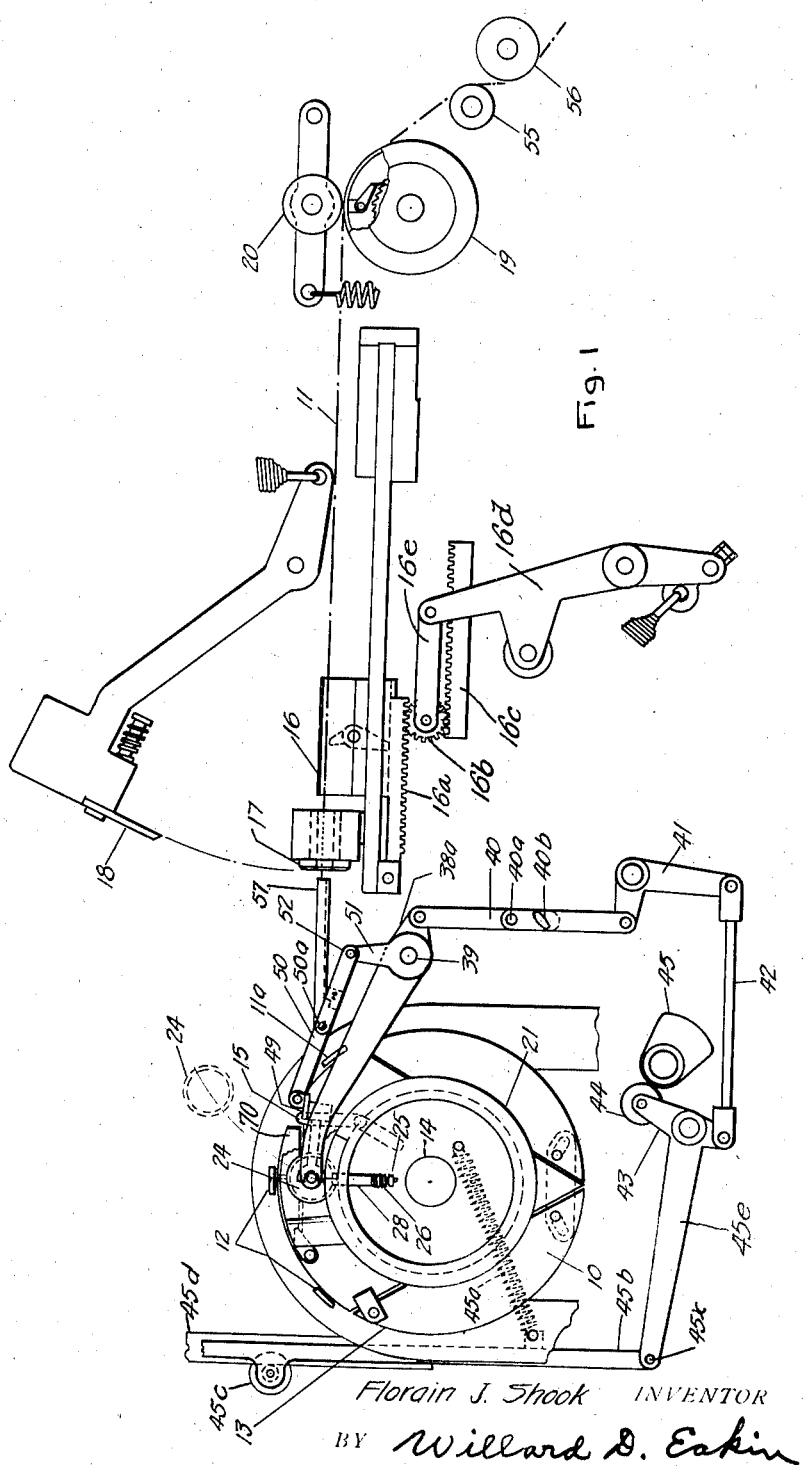
Florain J. Shook INVENTOR
BY Willard D. Eakin
ATTORNEY

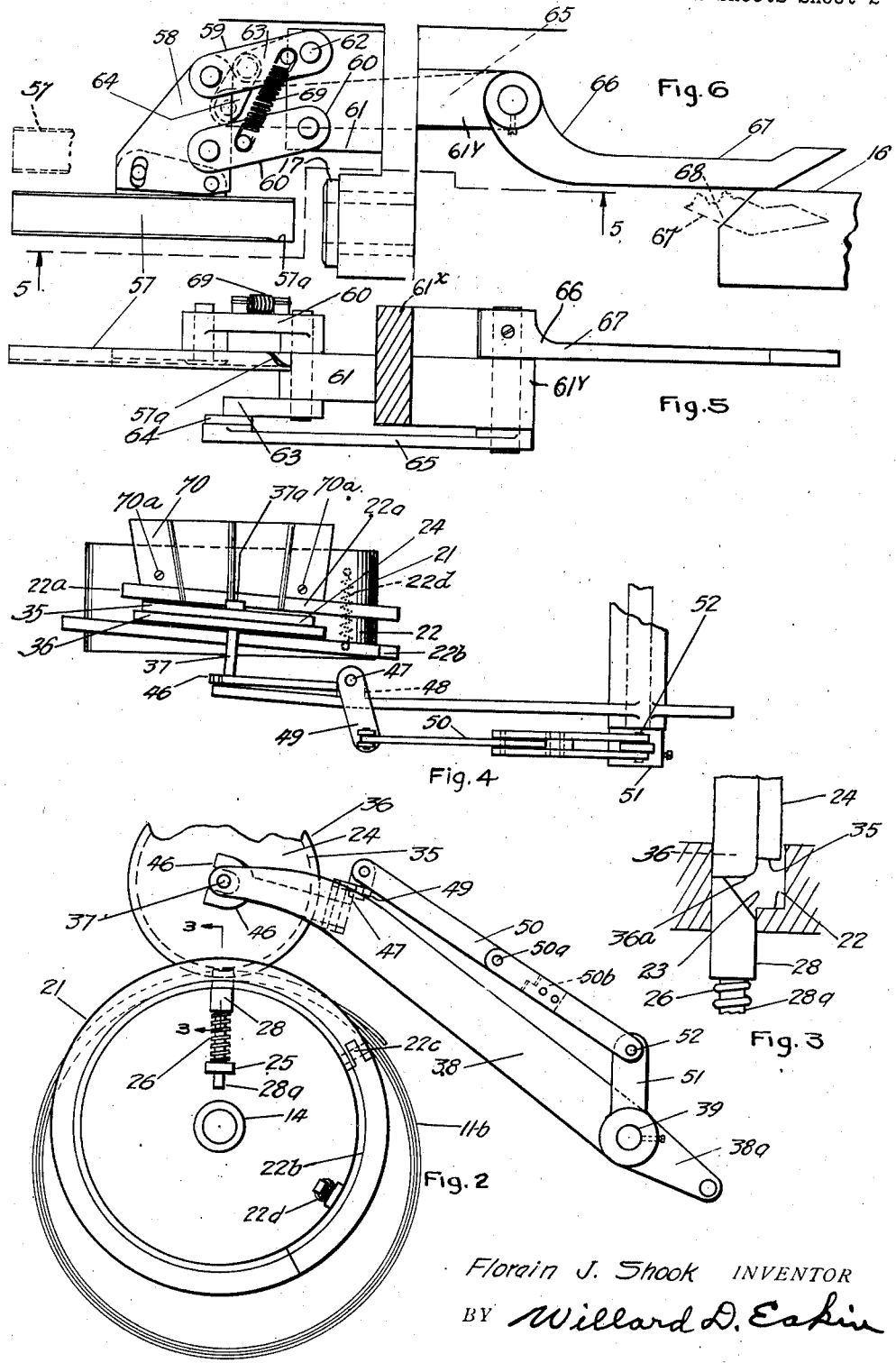

Patented Feb. 20, 1940

2,190,805

UNITED STATES PATENT OFFICE 2,190,805

APPARATUS FOR MAKING BEAD CORES FOR PNEUMATIC TIRES

Florain J. Shook, Akron, Ohio, assignor to National Standard Company, Niles, Mich., a corporation of Michigan Application July 8, 1937, Serial No. 152,615

14 Claims. (Cl. 154—9)

This invention relates to procedure and apparatus for making bead cores for pneumatic tires.

Its chief objects are to provide for economy in the manufacture of such bead cores; to provide an improved product; to produce a bead core consisting of a winding of rubberized metallic mesh material having its convolutions so well adhered to each other as to make it practicable to omit taping of the core at the two ends of the winding which heretofore has been commonly employed; to provide for preforming of the strip of metallic mesh material so that the last-wound end of the strip may be easily conformed and adhered to the underlying convolution of the winding; and to provide highly automatic means for performing the several steps of making the bead core, including an "ironing" step subsequent to the winding operation.

Of the accompanying drawings:

Fig. 1 is a somewhat diagrammatic side-elevation of a machine embodying and adapted for the practice of the invention in its preferred form.

Fig. 2 is a similar view on a larger scale, from the same viewpoint, of an "ironing" device constituting a part of the machine shown in Fig. 1.

Fig. 3 is a section on line 3—3 of Fig. 2.

Fig. 4 is a top view of the parts shown in Fig. 2.

Fig. 5 is a side elevation, from the same viewpoint as that of Figs. 1 and 2, of a device for guiding the leading end of the bead-core strip as it is projected, by suitable feeding means, to the form on which it is wound, a support for a guiding and severing die being shown in section on line 5—5 of Fig. 6.

Fig. 6 is a top view of the parts shown in Fig. 5 and of the guiding and severing die.

The original machine upon which the present invention is an improvement is fully shown and described in my copending application Serial No. 61,540, filed January 30, 1936, now Patent No. 2,083,350, of June 8, 1937, and it includes a winding form 10 having means for periodically turning it through a predetermined number of revolutions and stopping it in a determinate rotative position, to wind upon it a determinate number of convolutions of a bead core strip 11 plus a trailing-end portion 11$^a$ of such length, preferably, as to overlap the first-wound end of the first convolution by a few inches.

The original machine comprises also means timed with the stopping of the winding form and including push-off fingers 12, 12 (Fig. 1) for pushing the wound bead core off the form at the end of each winding operation, the form having a narrow annular face 13 on which the bead core is wound and being mounted on a projecting shaft 14, and preferably being sectional, as shown, for adjustment for bead cores of different diameters; a strip-clamping device including a jaw 15 suitably timed for anchoring in a notch in the form the leading end of a length of core strip projected into the notch by a suitably timed pawl-gripper feeder slide 16; a guiding and cutting die 17 through which the strip 11 is advanced first by the forward movement of the slide 16 and then by being drawn onto the form by the rotation of the latter; a suitably timed cutter 18 coacting with the die 17 for severing the successive bead core lengths from the continuous strip; and a ratchet and pawl one-way guide roller 19 provided with a spring-urged hold-down presser roller 20 for permitting forward feeding of the strip 11 by the slide 16 and by the rotation of the winding form but adapted to prevent backward movement of the strip while the slide 16 is making its return movement for a new grip on the strip, the one-way guide roller 19 preferably being knurled to give it a good grip on the strip.

The actuating mechanism for the pawl-gripper feeder slide 16 comprises a rack 16$^a$ secured to its lower side, a pinion 16$^b$ meshed with said rack and with a stationarily mounted rack 16$^c$, and a cam-actuated lever 16$^d$ connected to the pinion by a pair of links such as the link 16$^e$, this arrangement being such as to cause the feeder slide 16 to move twice as fast and far as the upper end of the lever 16$^d$.

The present invention resides in the provision of the several instrumentalities hereinafter described.

Mounted upon the projecting end portion of the shaft 14, in position to receive the annular bead core when the latter is pushed off the winding form 10 by the fingers 12, is an anvil member 21 having secured on its annular outer face a helical bead-core-positioning on cam member 22$^a$ defining a bead-core-receiving groove 22, the effective diameter of this anvil member being substantially less than that of the winding form, and consequently substantially less than that of the wound bead core, 11$^b$, so that the latter, falling onto the anvil member with its upper portion in the first convolution of the groove 22, is loosely suspended from the anvil member, as is clearly shown in Fig. 2, this arrangement being such that in the rotation of the shaft, form 10 and anvil member 21 in the winding of the next bead core the bead core that has been deposited upon the anvil member will be fed lengthwise of the shaft by a sort of screw-thread or conveyor action of the radial rear wall of the helical groove.

To assure that the bead core will position itself against the said rear wall as the bead core is received upon the anvil member, even though the bead core be narrower than the groove, the anvil member is formed, at the part thereof which is uppermost when it receives the bead-core, with a radial guide aperture for a cam member 28 which extends into the groove and is formed with a bevel cam face 23 (Fig. 3) adapted to crowd the bead core toward the rear wall of the groove as the hanging bead core is urged downward, first by gravity and then by the pressure of an "ironing roller" 24.

To permit the cam member to withdraw toward the shaft 14 under the force of the ironing roller 24 the cam member is formed with a guide-stem 28$^a$ slidably mounted in a bracket 25 projecting from the side or end face of the anvil member and for urging it outward toward its bead-core-receiving position a helical compression spring 26, surrounding the guide-stem, is mounted between the bracket 25 and the shoulder of the cam member at the outer end of its guide-stem portion.

For assuring that the presser roller 24 will not be violently engaged by the terminal end portion 22$^b$ of the helical rib or cam member 22$^a$ in rotation of the anvil member after the bead-core has passed therefrom, and also for assuring accurate positioning of the bead core and its last wound end portion on the anvil member as the presser roller completes its pressing operation, the said end portion 22$^b$ of the rib member is hinged to its main portion at 22$^c$ and is urged toward the adjacent convolution of the rib member by a pull-spring 22$^d$ connecting it with the anvil member.

The ironing roller 24 is formed with a cylindrical annular face 35 for pressing the bead-core against the floor of the groove 22 and, adjacent said cylindrical face, with an outwardly extending annular flange 36 having a generally radial but transversely rounded face 36$^a$ for keeping the bead core against the rear wall of the groove.

The ironing roller 24 is slidably journaled upon an axle 37 projecting from a lifting lever 38, to permit the roller, in the groove, to be fed toward the delivery end of the anvil member by being crowded by the bead core in contact with the radial face 36$^a$ of the flange 36, and the axle preferably is so positioned that the roller stands at a slight angle to the helical rib member, as shown clearly in Fig. 4, so that the roller will travel freely in the helical groove, the roller being of substantially the same width as the groove, with the face 35 of slightly less width than the bead, this arrangement assuring that the bead and its loose end portion will be properly positioned when the roller 24 is pressed against the rear wall of the groove by the spring-backed hinged section 22$^b$.

The lever 38 is fulcrumed on a shaft at 39 and has an arm 38$^a$ beyond its fulcrum which arm has connection through a "breakable" link 40, a bell-crank 41 and a link 42 with a bell-crank 43 provided with a cam roller 44 adapted to be engaged by a cam 45 for lifting the presser roller 24 to the dotted line position of Fig. 1; and for yieldingly holding the presser roller down upon the work when the cam 45 leaves the cam roller 44 a pull spring 45$^a$ connects a part of the machine frame with a vertical travelling lever 45$^b$, having other functions not material to the present invention, which is provided with a roller 45$^c$ running on a vertical rail 45$^d$, the lower end of the travelling lever being hinged to a lever arm 45$^e$ which is rigid with the cam-roller arm 43 and the position of the pull spring 45$^a$ being such as to exert an upward force upon the arm 45$^e$.

For sliding the ironing roller 24 on its axle 37 toward a stophead 37$^a$ on the latter, to return the roller, when the arm 38 is raised, to proper position for re-entering the bead-core-receiving portion of the groove 22 in being again lowered into operative position, a shifter-fork 46 straddling the axle 37 and adapted to bear against the adjacent side face of the roller is secured to a small vertical rock-shaft 47 which is mounted in an ear or lug 48 which projects from a side face of the lever 38, the rock-shaft 47 having secured on its upper end a rocker-arm 49 (Fig. 4) connected by a "breakable" link 50 with a stationary bracket 51, the connection of the link with the bracket, at 52, being some distance above the fulcrum 39 of the lever 38—38$^a$, so that as the presser-roller arm 38 of the said lever is raised the shifter-fork 46 will be swung in a clock-wise direction as viewed in Fig. 4, and then returned to its earlier position, by counter-clockwise movement, leaving the presser-roller properly positioned against the outer end of its axle, when the arm 38 is again lowered.

The links 40 and 50 are made "breakable", the former by reason of a hinge-pin 40$^a$ and a locking pin 40$^b$, and the latter by reason of a hinge-pin 50$^a$ and an over-center stop-block 50$^b$, only to permit the presser-roller arm to be lifted for the substitution of winding forms of different sizes and to permit the swinging of the shifter fork without movement of the arm 38.

For preforming the bead core strip 11 in the sense of giving it a slight permanent set such that it tends to assume a curved condition, although thereafter it is temporarily held somewhat straightened by tension of the feeding means in a part of its path to the winding form, the permanent set being such as to cause the strip to tend to hug the winding form, or at least to resist less strongly its conformance to the curvature of the winding form, a guide roller 55 of small radius is mounted in such position that the strip must pass partly around it, and thus be bent to its short radius of curvature, in passing from a guide roller 56 to the guide and holding roller 19.

Such preforming of the strip gives to its foremost portion, where it is severed by the cutter 18, a tendency to curve downward as it is projected beyond the die 17 by the feeder slide 16, which makes it desirable to provide guiding means between the die 17 and the winding form, to assure that the "preformed", projecting forward end of the strip will pass into the clamping notch of the form.

It is desirable that such guiding means be out of the way, to permit the trailing end of the "preformed" strip to snap downward onto or toward the underlying wound convolutions, when the strip is severed at the end of the winding operation.

The guiding means of the embodiment here shown comprises a guide trough 57 adjustably mounted upon a plate 58 constituting one member of a parallel motion of which the links 59, 60 (Figs. 5 and 6) connect the plate 58 with a stationary bracket member 61. The link 59 is secured on the upper end of a vertical rock-shaft 62 mounted in the stationary bracket member 61 and having on its lower end a rocker-arm 63 connected by a pull-link 64 with one arm 65 of a lever structure of which the other arm, 66, is provided with a cam member 67 adapted to be engaged by a cam face 68 formed on a part of the feeder-slide structure 16, to move the guide trough 57 into its guiding position at the beginning of the forward movement of the feeder-slide. A pull spring 69, connecting parts of the parallel-motion links 59, 60 which are at different distances from the fixed pivots of the links, is provided for removing the guide-trough from its guiding position as the cam face 68, in the return movement of the slide, passes out of contact with the cam member 67. This takes place in an early part of the winding operation, and at this time the forwardly moving strip, being "preformed" as described, is sufficiently arched between the die and the winding form to permit the latter to be withdrawn laterally without fouling it, the outer side flange of the guide trough being cut away at its end nearest the die, as indicated at 57ᵃ, to permit it to clear the strip at that position.

The stationary bracket member 61 is a lateral projection from a stationary arm 61ˣ in the outer end of which is mounted the guiding and cutting die 17. The stationary arm 61ˣ (Figs. 5 and 6) extends horizontally from a part of the framing of the machine and is formed also with an oppositely positioned lateral projection 61ʸ which serves as the mounting for the lever structure 65, 66.

An inclined guide or skid-plate 70 (Figs. 1 and 4) preferably is secured by screws 70ᵃ (Fig. 4) to the anvil member 21 for sliding the bead core onto the anvil member as its is pushed off of the winding form by the fingers 12.

The operation of the mechanism has been adequately brought out in the foregoing description of the construction, the arrangement being such that successive bead cores are automatically wound and "ironed" or pressed to compact the convolutions and adhere them together, at the leading and the trailing end portions of the winding, and the bead cores in succession are crowded off the delivery end of the anvil member, falling by gravity onto such receiving means as may be provided.

I claim:

1. The combination of means for winding a strip of material to form an annulus, means timed therewith for pressing a superposed portion of the strip upon an underlying portion by progression lengthwise of the strip, the said means for pressing being spaced, in an axial direction, from the said means for winding, and automatic means for transferring the annulus from the first said means to the second said means.

2. The combination of means for winding a strip of material to form an annulus, means timed therewith for pressing a superposed portion of the strip upon an underlying portion by progression lengthwise of the strip, the said means for pressing being spaced, in an axial direction, from the said means for winding, and automatic means for transferring the annulus from the first said means to the second said means, the winding means and the pressing means comprising a winding form and an anvil member both mounted upon a projecting shaft and the anvil member being provided with helical cam means for crowding toward and off of its outer end and an annulus suspended on the anvil member.

3. The combination of means for winding a strip of material to form an annulus, means timed therewith for pressing a superposed portion of the strip upon an underlying portion by progression lengthwise of the strip, and automatic means for transferring the annulus from the first said means to the second said means, the winding means and the pressing means comprising a winding form and an anvil member both mounted upon a projecting shaft and the anvil member being formed with a helical cam face for crowding toward and off of its outer end an annulus suspended on the anvil member.

4. The combination of means for winding a strip of material to form an annulus, means timed therewith for pressing a superposed portion of the strip upon an underlying portion by progression lengthwise of the strip, and automatic means for transferring the annulus from the first said means to the second said means, the winding means comprising a winding form, means for severing successive lengths of the strip of material, and means for preforming the strip to a curvature adapting it to be easily conformed to the surface of the winding form.

5. The combination of means for winding a strip of material to form an annulus, means timed therewith for pressing a superposed portion of the strip upon an underlying portion by progression lengthwise of the strip, and automatic means for transferring the annulus from the first said means to the second said means, the winding means comprising a winding form, and means for preforming the strip to a curvature adapting it to be easily conformed to the surface of the winding form.

6. The combination of means for winding a strip of material to form an annulus, means timed therewith for pressing a superposed portion of the strip upon an underlying portion by progression lengthwise of the strip, and automatic means for transferring the annulus from the first said means to the second said means, the winding means comprising a winding form, means for preforming the strip to a curvature adapting it to be easily conformed to the surface of the winding form, and means for guiding the leading end portion of the strip under an only temporarily effective straightening strain onto the winding form.

7. The combination of means for winding a strip of material to form an annulus, means timed therewith for pressing a superposed portion of the strip upon an underlying portion by progression lengthwise of the strip, and automatic means for transferring the annulus from the first said means to the second said means, the winding means comprising a winding form, means for preforming the strip to a curvature adapting it to be easily conformed to the surface of the winding form, means for guiding the leading end portion of the strip under an only temporarily effective straightening strain onto the winding form, the guiding means being so mounted as to have an operative position in alignment with the path of the strip and an inoperative position out of the way of the strip and being shiftable from one to the other of said positions in alternation, and means for shifting the guiding means from its operative position to its inoperative position.

8. Apparatus for making a wound annulus of strip material, said apparatus comprising a winding form, means for preforming the strip to a curvature adapting it to be easily conformed to the surface of the winding form, means for guiding the leading end portion of the strip under an only temporarily effective straightening strain onto the winding form, the guiding means being so mounted as to have an operative position in alignment with the path of the strip and an inoperative position out of the way of the strip and being shiftable from one to the other of said positions in alternation and means for shifting the guiding means from its operative position to its inoperative position.

9. Apparatus for pressing an annular article, said apparatus comprising an anvil member provided with helical cam means for crowding toward and off of the end thereof an annular article bearing upon it, means for pressing the article against the anvil member, and means for effecting relative rotation of the anvil member and the article to cause the crowding action.

10. Apparatus for pressing an annular article, said apparatus comprising an anvil member formed with a helical cam face for crowding toward and off of the end thereof an annular article bearing upon it, means for pressing the article against the anvil member, and means for effecting relative rotation of the anvil member and the article to cause the crowding action.

11. Apparatus for pressing an annular article, said apparatus comprising an anvil member provided with helical cam means for crowding toward and off of the end thereof an annular article bearing upon it, means for pressing the article against the anvil member, means for effecting relative rotation of the anvil member and the article to cause the crowding action, and means for holding the article against movement away from the cam means.

12. Apparatus for pressing an annular article, said apparatus comprising an anvil member provided with helical cam means for crowding toward and off of the end thereof an annular article bearing upon it, means for pressing the article against the anvil member, means for effecting relative rotation of the anvil member and the article to cause the crowding action, and spring backed means for holding the article against movement away from the cam means.

13. Apparatus for pressing an annular article, said apparatus comprising an anvil member provided with helical cam means for crowding toward and off of the end thereof an annular article bearing upon it, means for pressing the article against the anvil member, means for effecting relative rotation of the anvil member and the article to cause the crowding action, and means for so holding the article comprising a spring-backed member formed with a cam face for engagement with the article.

14. Apparatus for pressing an annular article, said apparatus comprising an anvil member provided with helical cam means for crowding toward and off of the end thereof an annular article bearing upon it, means for pressing the article against the anvil member, means for effecting relative rotation of the anvil member and the article to cause the crowding action, and means for holding the article against movement away from the cam means, the means for so holding the article comprising a radially-yielding spring-backed member formed with a cam face for engagement with the article.

FLORAIN J. SHOOK.